US010041570B2

(12) United States Patent
Iwase et al.

(10) Patent No.: US 10,041,570 B2
(45) Date of Patent: Aug. 7, 2018

(54) POWER TRANSMISSION DEVICE

(71) Applicant: AISIN AW CO., LTD., Anjo-shi, Aichi-ken (JP)

(72) Inventors: Mikio Iwase, Anjo (JP); Minoru Todo, Takahama (JP); Hiroshi Yoshikawa, Nagoya (JP); Naoya Jinnai, Anjo (JP); Natsuki Sada, Anjo (JP); Takuya Nakajima, Toyota (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 276 days.

(21) Appl. No.: 15/033,937

(22) PCT Filed: Nov. 28, 2014

(86) PCT No.: PCT/JP2014/081633
§ 371 (c)(1),
(2) Date: May 3, 2016

(87) PCT Pub. No.: WO2015/080267
PCT Pub. Date: Jun. 4, 2015

(65) Prior Publication Data
US 2016/0265630 A1     Sep. 15, 2016

(30) Foreign Application Priority Data
Nov. 29, 2013  (JP) ................. 2013-248651

(51) Int. Cl.
*B60K 5/12* (2006.01)
*F16H 3/66* (2006.01)
*F16H 63/34* (2006.01)
*B60T 1/06* (2006.01)
(Continued)

(52) U.S. Cl.
CPC .............. *F16H 3/663* (2013.01); *B60T 1/062* (2013.01); *F16H 57/025* (2013.01);
(Continued)

(58) Field of Classification Search
CPC .................... F16H 2200/00–2200/2097; F16H 57/00–57/028; F16H 63/3425;
(Continued)

(56) References Cited

U.S. PATENT DOCUMENTS 5,055,098 A * 10/1991 Umebayashi ............. F16H 3/66
475/312
2002/0134182 A1* 9/2002 Schleuder ............. F16H 57/021
74/339

(Continued)

FOREIGN PATENT DOCUMENTS

DE  10 2005 005 616 A1   8/2006
JP       4-201624 A       7/1992
(Continued)

OTHER PUBLICATIONS

International Search Report for PCT/JP2014/081633 dated Mar. 3, 2015.

*Primary Examiner* — Ramya P Burgess
*Assistant Examiner* — Lillian T Nguyen
(74) *Attorney, Agent, or Firm* — Sughrue Mion, PLLC

(57) ABSTRACT

A first planetary gear and a clutch are placed between a second carrier of a second planetary gear and an output shaft in the axial direction. A transmission case has a small diameter tubular portion that rotatably supports an output shaft, an annular wall portion extended radially outward from the small diameter tubular portion, and a large diameter tubular portion extended in the axial direction from the outer periphery of the annular wall portion such that the first planetary gear and the clutch are partially surrounded. A mount is fixed to a vehicle body of a vehicle so as to at least partially overlap the small diameter tubular portion, the annular wall portion, and the large diameter tubular portion as viewed in the radial direction. A parking gear of a parking lock device is coupled to the outer periphery of the second carrier.

20 Claims, 5 Drawing Sheets

(51) Int. Cl.
*F16H 57/025* (2012.01)
*F16H 57/028* (2012.01)

(52) U.S. Cl.
CPC ....... *F16H 57/028* (2013.01); *F16H 63/3425* (2013.01); *F16H 2200/0069* (2013.01); *F16H 2200/201* (2013.01); *F16H 2200/2023* (2013.01); *F16H 2200/2046* (2013.01)

(58) Field of Classification Search
CPC .............. F16H 3/00–3/70; B60T 1/062; B60K 5/1216; B60K 5/1218
See application file for complete search history.

(56) References Cited

U.S. PATENT DOCUMENTS

| | | | | |
|---|---|---|---|---|
| 2005/0082096 | A1* | 4/2005 | Oono | B60K 6/445 180/65.235 |
| 2005/0272553 | A1 | 12/2005 | Raghavan et al. | |
| 2010/0029429 | A1* | 2/2010 | Ota | B60K 6/365 475/5 |
| 2012/0306234 | A1* | 12/2012 | Akaki | B62D 21/02 296/187.03 |

FOREIGN PATENT DOCUMENTS

| | | |
|---|---|---|
| JP | 7-49810 B2 | 5/1995 |
| JP | 9-301141 A | 11/1997 |
| JP | 2002-106688 A | 4/2002 |
| JP | 2009-63006 A | 3/2009 |
| JP | 2011-31844 A | 2/2011 |

\* cited by examiner

FIG.3

| | C1 | C2 | C3 | C4 | B1 | B2 | GEAR RATIO | STEP RATIO |
|---|---|---|---|---|---|---|---|---|
| 1st | O | O | – | – | – | O | 5.091 | 1.581 |
| 2nd | O | – | – | – | O | O | 3.219 | 1.385 |
| 3rd | – | O | – | – | O | O | 2.324 | 1.232 |
| 4th | – | – | – | O | O | O | 1.886 | 1.265 |
| 5th | – | O | – | O | O | – | 1.491 | 1.251 |
| 6th | O | – | – | O | O | – | 1.192 | 1.192 |
| 7th | O | – | O | O | – | – | 1.000 | 1.273 |
| 8th | – | – | O | O | O | – | 0.785 | 1.242 |
| 9th | O | – | O | – | O | – | 0.632 | 1.076 |
| 10th | – | O | O | – | O | – | 0.588 | 0.955 |
| REV. | – | O | O | – | – | O | -4.860 | |
| | *"O":ENGAGED, "–":DISENGAGED | | | | | | SPREAD | 8.660 | ically known as a transmission for rear
POWER TRANSMISSION DEVICE

CROSS REFERENCE TO RELATED APPLICATIONS

This application is a National Stage of International Application No. PCT/JP2014/081633 filed Nov. 28, 2014, claiming priority based on Japanese Patent Application No. 2013-248651 filed Nov. 29, 2013, the contents of all of which are incorporated herein by reference in their entirety.

TECHNICAL FIELD

The present disclosure relates to power transmission devices that include a multi-speed transmission and a parking lock device.

BACKGROUND ART

A transmission that has vibration isolating rubber and that is supported by a vehicle body via a mount fixed to a cross member is conventionally known as a transmission for rear wheel drive vehicles which is connected to an engine (see, e.g., Patent Document 1). A power transmission device including a parking mechanism that locks an output shaft coupled to an output member of a speed change mechanism is also conventionally known as a power transmission device including a speed change mechanism (see, e.g., Patent Document 2). In this power transmission device, the output shaft of the speed change mechanism has a hub extending in the radial direction. A spline portion that couples the output shaft and the output member and a parking gear of the parking mechanism are arranged side by side in the axial direction on the outer periphery of the hub, and teeth of the parking gear and teeth of the splines are common teeth.

RELATED ART DOCUMENTS

Patent Documents

[Patent Document 1] Japanese Examined Patent Application Publication No. S60-48361
[Patent Document 2] Japanese Patent Application Publication No. 2002-106688 (JP 2002-106688 A)

SUMMARY

A larger mount (vibration isolating rubber) is sometimes required for such a power transmission device so as not to transmit vibration of the speed change mechanism to the vehicle body. For example, a constituent member such as a muffler is sometimes placed near the power transmission device in the vehicle body of the vehicle on which the power transmission device is mounted. It is not easy to change the mounting position of a vehicle body-side constituent member such as the mount in the vehicle body. A case of the power transmission device (the speed change mechanism) therefore need be configured so as not to interfere with the vehicle body-side constituent member such as the mount. However, in the case where the case is configured so as not to interfere with the vehicle body-side constituent member, the space in the case is limited, and it may not be possible to place a parking lock device in the case such that the parking gear is not tilted during a parking lock operation.

It is a primary object of the present disclosure to provide a power transmission device that can suppress interference between a case and a vehicle body-side constituent member and can stabilize the orientation of a parking gear during a parking lock operation.

A power transmission device of the present disclosure is a power transmission device including
a multi-speed transmission that has a planetary gear and that shifts power transmitted from a driving source of a vehicle to an input member to transmit the shifted power to an output member, a parking lock device having a parking gear and a parking pawl that can be engaged with the parking gear, and a case that accommodates the multi-speed transmission and the parking lock device, wherein
the planetary gear has a carrier that is rotatably supported by a central shaft rotatably supported by the case and that is coupled to the output member such that the carrier rotates together with the output member,
at least one of another planetary gear different from the planetary gear included in the multi-speed transmission and a clutch is placed between the carrier and the output member in an axial direction,
the case has a small diameter tubular portion rotatably supporting the output member, an annular wall portion extended radially outward from the small diameter tubular portion, and a large diameter tubular portion extended in the axial direction from an outer periphery of the annular wall portion such that at least one of at least a part of the other planetary gear and at least a part of the clutch is surrounded,
a vehicle body-side constituent member is fixed to a vehicle body of the vehicle so as to at least partially overlap the small diameter tubular portion, the annular wall portion, and the large diameter tubular portion of the case as viewed in a radial direction of the power transmission device, and
the parking gear is coupled to an outer periphery of the carrier so as to rotate together with the carrier.

In this power transmission device, the case that accommodates the planetary gear and the parking lock device has the small diameter tubular portion rotatably supporting the output member, the annular wall portion extended radially outward from the small diameter tubular portion, and the large diameter tubular portion extended in the axial direction from the outer periphery of the annular wall portion. The large diameter tubular portion of the case surrounds at least one of at least a part of the other planetary gear other than the planetary gear and at least a part of the clutch. Moreover, the small diameter tubular portion, the annular wall portion, and the large diameter tubular portion of the case at least partially overlap the vehicle body-side constituent member fixed to the vehicle body, as viewed in the radial direction. This can restrain interference between the case and the vehicle body-side constituent member without changing the mounting position of the vehicle body-side constituent member in the vehicle body. The carrier of the planetary gear is rotatably supported by the central shaft rotatably supported by the case, and is coupled to the output member so as to rotate together with the output member. The parking gear is coupled to the outer periphery of the carrier of the planetary gear so as to rotate together with the carrier. That is, the parking gear is disposed on the carrier that is stably supported by the case via an intermediate shaft (and the output member) such that the axis of the carrier is not tilted, and that has high rigidity. This can increase flexibility in selecting the mounting position of the parking lock device, i.e., the parking pawl etc., and can satisfactorily restrain the parking gear from being tilted during a parking lock operation of locking the output member by engaging the parking pawl with the parking gear. As a result, in this power transmission device, interference between the case and the vehicle body-side constituent member can be suppressed and the orientation of the parking gear during the parking lock operation can be stabilized.

BRIEF DESCRIPTION OF THE DRAWINGS

FIG. 3 is an operation table showing the relationship between each shift speed and the operating state of clutches and brakes in the multi-speed transmission of the power transmission device in FIG. 1.

DETAILED DESCRIPTION OF THE PREFERRED EMBODIMENTS

Modes for carrying out the present disclosure will be described with reference to the accompanying drawings.

Figure 1:
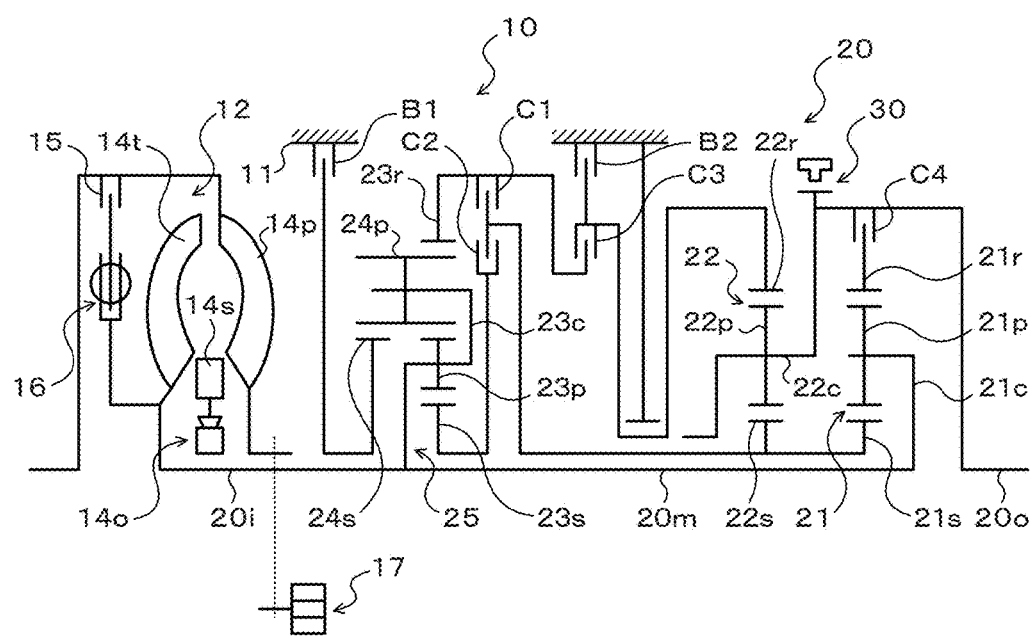
FIG. 1 is a schematic configuration diagram of a power transmission device according to an exemplary embodiment.

FIG. 1 is a schematic configuration diagram of a power transmission device 10 according to an exemplary embodiment. The power transmission device 10 shown in the figure is connected to a crankshaft of an engine (internal combustion engine), not shown, as a driving source mounted longitudinally in the front part of a rear wheel drive vehicle and/or to a rotor of an electric motor, and can transmit power (torque) from the engine etc. to right and left rear wheels (driving wheels), not shown. As shown in the figure, the power transmission device 10 includes an automatic transmission 20 that shifts the power transmitted from the engine etc. to an input shaft 20$i$ to transmit the shifted power to an output shaft 20$o$, a transmission case (stationary member) 11, a staring device (fluid transmission device) 12, an oil pump 17, a parking lock device 30, etc.

The starting device 12 includes a torque converter having an input-side pump impeller 14$p$ that is coupled to such a driving source as described above, an output-side turbine runner 14$t$ that is coupled to the input shaft (input member) 20$i$ of the automatic transmission 20, a stator 14$s$ that is placed inside the pump impeller 14$p$ and the turbine runner 14$t$ to adjust the flow of hydraulic oil from the turbine runner 14$t$ to the pump impeller 14$p$, a one-way clutch 14$o$ that is supported by a stator shaft, not shown, and that allows the stator 14$s$ to rotate only in one direction, etc. The starting device 12 further includes a lockup clutch 15 that connects and disconnects a front cover coupled to the crankshaft of the engine etc. to and from the input shaft 20$i$ of the automatic transmission 20, and a damper mechanism 16 that is disposed between the front cover and the input shaft 20$i$ of the automatic transmission 20 to damp vibration. The starting device 12 may include a fluid coupling that does not have the stator 14$s$.

The oil pump 17 is configured as a gear pump having a pump assembly including a pump body and a pump cover, an external gear (inner rotor) coupled to the pump impeller 14$p$ of the starting device 12 via a chain or a gear train, an internal gear (outer rotor) meshing with the external gear, etc. The oil pump 17 is driven by the power from the engine etc. to suck hydraulic oil (ATF) stored in an oil pan, not shown, to pressure-feed the sucked hydraulic oil to a hydraulic control device, not shown.

The automatic transmission 20 is configured as a ten-speed transmission. As shown in FIG. 1, the automatic transmission 20 includes, in addition to the input shaft 20$i$, the output shaft (output member) 20$o$ that is coupled to the right and left rear wheels via a differential gear and a drive shaft, both not shown, a single-pinion type first planetary gear 21 and a single-pinion type second planetary gear 22 which are arranged side by side in the axial direction of the automatic transmission 20 (the input shaft 20$i$ and the output shaft 20$o$), and a Ravigneaux type planetary gear mechanism 25 as a compound planetary gear mechanism formed by combination of a double-pinion type planetary gear and a single-pinion type planetary gear. The automatic transmission 20 further includes a clutch C1 (first clutch) as a first engagement element, a clutch C2 (second clutch) as a second engagement element, a clutch C3 (third clutch) as a third engagement element, a clutch C4 (fourth clutch) as a fourth engagement element, a brake B1 (first brake) as a fifth engagement element, and a brake B2 (second brake) as a sixth engagement element in order to change a power transmission path from the input shaft 20$i$ to the output shaft 20$o$.

In the present embodiment, the first and second planetary gears 21, 22 and the Ravigneaux type planetary gear mechanism 25 are placed in the transmission case 11 so as to be arranged in order of the Ravigneaux type planetary gear mechanism 25, the second planetary gear 22, and the first planetary gear 21, namely in order of the single-pinion type planetary gear of the Ravigneaux type planetary gear mechanism 25, the double-pinion type planetary gear of the Ravigneaux type planetary gear mechanism 25, the second planetary gear 22, and the first planetary gear 21, from the starting device 12 side, namely from the engine side (the left side in FIG. 1). The Ravigneaux type planetary gear mechanism 25 is thus placed on the front side of the vehicle so as to be located near the starting device 12. The first planetary gear 21 is placed on the rear side of the vehicle so as to be located near the output shaft 20$o$. Moreover, the second planetary gear 22 is placed between the Ravigneaux type planetary gear mechanism 25 and the first planetary gear 21 in the axial direction of the input shaft 20$i$, the output shaft 20$o$, etc.

The first planetary gear 21 has a first sun gear 21$s$ as an external gear, a first ring gear 21$r$ as an internal gear placed concentrically with the first sun gear 21$s$, a plurality of first pinion gears 21$p$ each meshing with the first sun gear 21$s$ and the first ring gear 21$r$, and a first carrier 21$c$ holding the plurality of first pinion gears 21$p$ such that the first pinion gears 21$p$ can rotate (turn) and revolve. In the present embodiment, the gear ratio λ1 of the first planetary gear 21 (the number of teeth of the first sun gear 21$s$/the number of teeth of the first ring gear 21$r$) is set to, e.g., λ1=0.277.

As shown in FIG. 1, the first carrier 21$c$ of the first planetary gear 21 is constantly coupled (fixed) to an intermediate shaft 20$m$ of the automatic transmission 20 which is coupled to the input shaft 20$i$. Accordingly, when the power is being transmitted from the engine etc. to the input shaft 20$i$, the power from the engine etc. is constantly transmitted to the first carrier 21$c$ via the input shaft 20$i$ and the intermediate shaft 20$m$. The first carrier 21$c$ functions as an input element of the first planetary gear 21 (a first input element of the automatic transmission 20) when the clutch C4 is in an engaged state. The first carrier 21$c$ idles when the clutch C4 is in a disengaged state. The first ring gear 21r functions as an output element of the first planetary gear 21 (a first output element of the automatic transmission 20) when the clutch C4 is in an engaged state.

The second planetary gear 22 has a second sun gear 22s as an external gear, a second ring gear 22r as an internal gear placed concentrically with the second sun gear 22s, a plurality of second pinion gears 22p each meshing with the second sun gear 22s and the second ring gear 22r, and a second carrier (planetary carrier) 22c holding the plurality of second pinion gears 22p such that the second pinion gears 22p can rotate (turn) and revolve. In the present embodiment, the gear ratio λ2 of the second planetary gear 22 (the number of teeth of the second sun gear 22s/the number of teeth of the second ring gear 22r) is set to, e.g., λ2=0.244.

As shown in FIG. 1, the second sun gear 22s of the second planetary gear 22 is integral with (constantly coupled to) the first sun gear 21s of the first planetary gear 21 and always rotates or stops together with (and coaxially with) the first sun gear 21s. However, the first sun gear 21s and the second sun gear 22s may be formed as separate members and may be constantly coupled together via a coupling member (a first coupling member), not shown. The second carrier 22c of the second planetary gear 22 is constantly coupled to the output shaft 20o and always rotates or stops together with (and coaxially with) the output shaft 20o. The second carrier 22c thus functions as an output element of the second planetary gear 22 (a second output element of the automatic transmission 20). Moreover, the second ring gear 22r of the second planetary gear 22 functions as a fixable element of the second planetary gear 22 (a first fixable element of the automatic transmission 20).

The Ravigneaux type planetary gear mechanism 25 has a third sun gear 23s and a fourth sun gear 24s as external gears, a third ring gear 23r as an internal gear placed concentrically with the third sun gear 23s, a plurality of third pinion gears (short pinion gears) 23p meshing with the third sun gear 23s, a plurality of fourth pinion gears (long pinion gears) 24p meshing with the fourth sun gear 24s and the plurality of third pinion gears 23p and meshing with the third ring gear 23r, and a third carrier 23c holding the plurality of third pinion gears 23p and the plurality of fourth pinion gears 24p such that the plurality of third pinion gears 23p and the plurality of fourth pinion gears 24p can rotate (turn) and revolve.

Such a Ravigneaux type planetary gear mechanism 25 is a compound planetary gear mechanism formed by combination of a double-pinion type planetary gear (a third planetary gear) and a single-pinion type planetary gear (a fourth planetary gear). That is, the third sun gear 23s, the third carrier 23c, the third and fourth pinion gears 23p, 24p, and the third ring gear 23r of the Ravigneaux type planetary gear mechanism 25 form the double-pinion type third planetary gear. The fourth sun gear 24s, the third carrier 23c, the fourth pinion gears 24p, and the third ring gear 23r of the Ravigneaux type planetary gear mechanism 25 form the single-pinion type fourth planetary gear. In the present embodiment, the Ravigneaux type planetary gear mechanism 25 is configured such that the gear ratio λ3 of the double-pinion type third planetary gear (the number of teeth of the third sun gear 23s/the number of teeth of the third ring gear 23r) is, e.g., λ3=0.488 and the gear ratio λ4 of the single-pinion type fourth planetary gear (the number of teeth of the fourth sun gear 24s/the number of teeth of the third ring gear 23r) is, e.g., λ4=0.581.

Of the rotary elements of the Ravigneaux type planetary gear mechanism 25 (the third and fourth planetary gears), the fourth sun gear 24s functions as a fixable element of the Ravigneaux type planetary gear mechanism 25 (a second fixable element of the automatic transmission 20). Moreover, as shown in FIG. 1, the third carrier 23c is constantly coupled (fixed) to the input shaft 20i, and is constantly coupled to the first carrier 21c of the first planetary gear 21 via the intermediate shaft 20m as a coupling member (a second coupling member). Accordingly, when the power is being transmitted from the engine etc. to the input shaft 20i, the power from the engine etc. is constantly transmitted to the third carrier 23c via the input shaft 20i. The third carrier 23c thus functions as an input element of the Ravigneaux type planetary gear mechanism 25 (a second input element of the automatic transmission 20). The third ring gear 23r functions as a first output element of the Ravigneaux type planetary gear mechanism 25, and the third sun gear 23s functions as a second output element of the Ravigneaux type planetary gear mechanism 25.

The clutch C1 connects and disconnects the first sun gear 21s of the first planetary gear 21 and the second sun gear 22s of the second planetary gear 22, which are constantly coupled together, to and from the third ring gear 23r as the first output element of the Ravigneaux type planetary gear mechanism 25. In the present embodiment, the clutch C1 is placed between the second planetary gear 22 and the Ravigneaux type planetary gear mechanism 25 so as to be located near the Ravigneaux type planetary gear mechanism 25 (the third planetary gear). The clutch C2 connects and disconnects the first sun gear 21s of the first planetary gear 21 and the second sun gear 22s of the second planetary gear 22, which are constantly coupled together, to and from the third sun gear 23s as the second output element of the Ravigneaux type planetary gear mechanism 25. In the present embodiment, the clutch C2 is placed between the second planetary gear 22 and the Ravigneaux type planetary gear mechanism 25 such that at least a part of the clutch C2 is surrounded by a constituent member of the clutch C1 and such that the clutch C2 is located near the Ravigneaux type planetary gear mechanism 25 (the third planetary gear).

The clutch C3 connects and disconnects the second ring gear 22r of the second planetary gear 22 to and from the third ring gear 23r as the first output element of the Ravigneaux type planetary gear mechanism 25. In the present embodiment, the clutch C3 is placed between the second planetary gear 22 and the Ravigneaux type planetary gear mechanism 25 so as to be located near the second planetary gear 22. The clutch C4 connects and disconnects the first ring gear 21r as the output element of the first planetary gear 21 to and from the output shaft 20o. In the present embodiment, the clutch C4 is placed on the opposite side of the second planetary gear 22 from the Ravigneaux type planetary gear mechanism 25, namely on the rear side of the vehicle (the right side in FIG. 1) with respect to the first planetary gear 21, so as to be located closest to the output shaft 20o among the four clutches C1 to C4 and the two brakes B1, B2.

The brake B1 holds (connects) the fourth sun gear 24s as the fixable element of the Ravigneaux type planetary gear mechanism 25 stationary to the transmission case 11 as the stationary member so as not to allow the fourth sun gear 24s to rotate, and disconnects the fourth sun gear 24s from the transmission case 11 so as to allow the fourth sun gear 24s to rotate. In the present embodiment, the brake B1 is placed on the opposite side of the Ravigneaux type planetary gear mechanism 25 from the first and second planetary gears 21, 22, namely on the front side of the vehicle (the left side in FIG. 1) with respect to the Ravigneaux type planetary gear mechanism 25, so as to be located closest to the starting device 12 (the engine) among the four clutches C1 to C4 and the two brakes B1, B2. The brake B2 holds (connects) the second ring gear 22r as the fixable element of the second planetary gear 22 stationary to the transmission case 11 so as not to allow the second ring gear 22r to rotate, and disconnects the second ring gear 22r from the transmission case 11 as the stationary member so as to allow the second ring gear 22r to rotate. In the present embodiment, the brake B2 is placed between the second planetary gear 22 and the Ravigneaux type planetary gear mechanism 25 so as to surround at least a part of the clutch C3 and so as to be located near the second planetary gear 22.

In the present embodiment, multi-plate friction hydraulic clutches (friction engagement elements) that have a hydraulic servo formed by a piston, a plurality of friction engagement plates (e.g., friction plates as annular members having a friction material boned to both surfaces thereof and separator plates as annular members both surfaces of which are smooth), an engagement oil chamber and a centrifugal oil pressure cancel chamber to which hydraulic oil is supplied, etc. are used as the clutches C1 to C4. Multi-plate friction hydraulic brakes that have a hydraulic servo formed by a piston, a plurality of friction engagement plates (friction plates and separator plates), an engagement oil chamber to which hydraulic oil is supplied, etc. are used as the brakes B1, B2. The clutches C1 to C4 and the brakes B1, B2 operate according to supply and discharge of hydraulic oil by the hydraulic control device, not shown.

Figure 2:
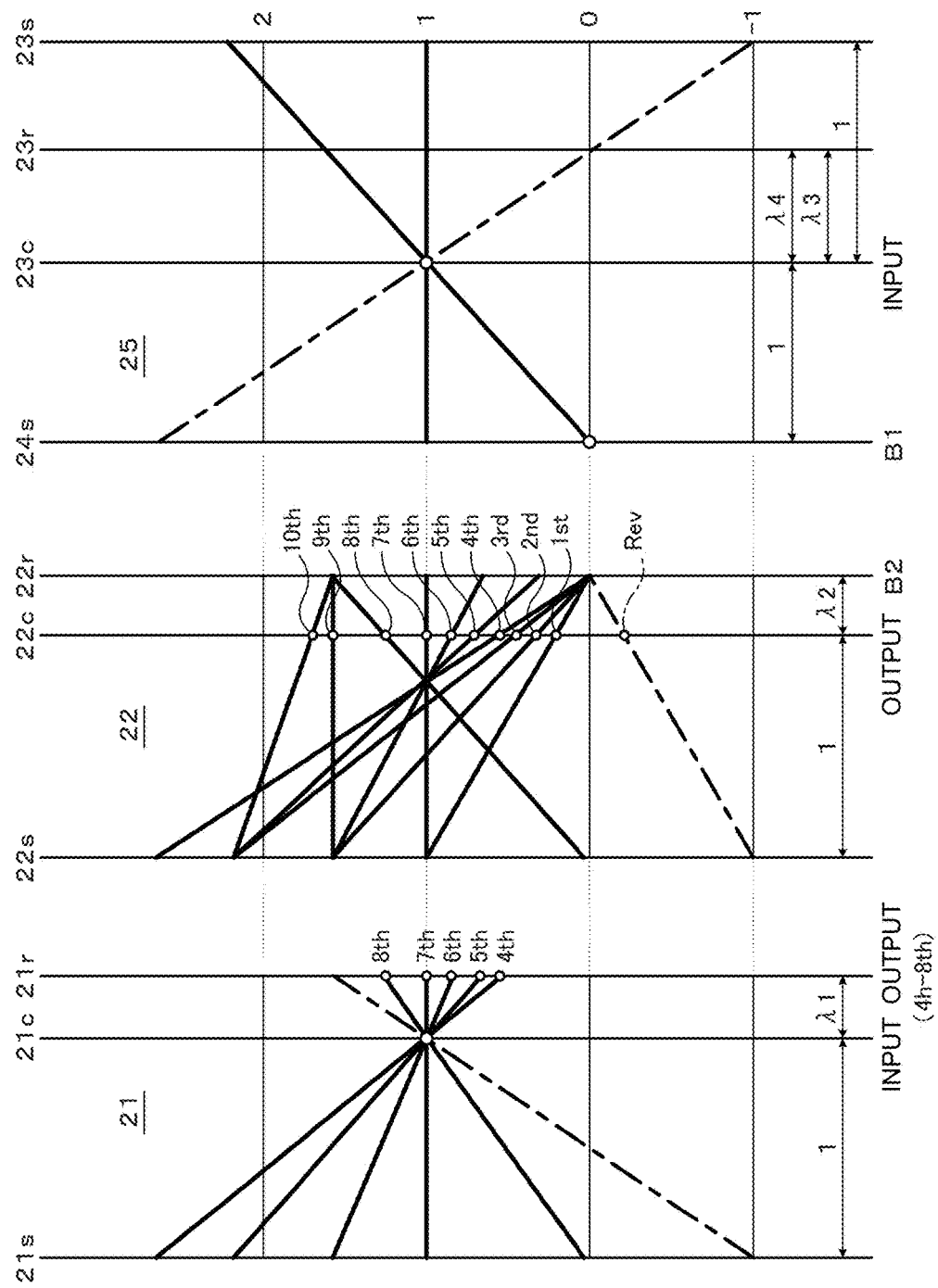
FIG. 2 is a speed diagram showing the ratio of the rotational speed of each rotary element to the input rotational speed in a multi-speed transmission of the power transmission device in FIG. 1.

FIG. 2 is a speed diagram showing the ratio of the rotational speed of each rotary element to the rotational speed of the input shaft 20i (the input rotational speed) in the automatic transmission 20 (the rotational speed of the input shaft 20i, i.e., the first carrier 21c and the third carrier 23c, is the value of 1). FIG. 3 is an operation table showing the relationship between each shift speed and the operating state of the clutches C1 to C4 and the brakes B1, B2 in the automatic transmission 20.

As shown in FIG. 2, the three rotary elements of the single-pinion type first planetary gear 21, namely the first sun gear 21s, the first ring gear 21r, and the first carrier 21c, are arranged in order of the first sun gear 21s, the first carrier 21c, and the first ring gear 21r from the left in the figure at intervals corresponding to the gear ratio $\lambda 1$ on the speed diagram of the first planetary gear 21 (the speed diagram on the left side in FIG. 2). In the present disclosure, according to the order in which the rotary elements are arranged, the first sun gear 21s is a first rotary element of the automatic transmission 20, the first carrier 21c is a second rotary element of the automatic transmission 20, and the first ring gear 21r is a third rotary element of the automatic transmission 20. Accordingly, the first planetary gear 21 has the first rotary element, the second rotary element, and the third rotary element of the automatic transmission 20 which are sequentially arranged at the intervals corresponding to the gear ratio $\lambda 1$ on the speed diagram.

The three rotary elements of the single-pinion type second planetary gear 22, namely the second sun gear 22s, the second ring gear 22r, and the second carrier 22c, are arranged in order of the second sun gear 22s, the second carrier 22c, and the second ring gear 22r from the left in the figure at intervals corresponding to the gear ratio $\lambda 2$ on the speed diagram of the second planetary gear 22 (the speed diagram in the middle in FIG. 2). In the present disclosure, according to the order in which the rotary elements are arranged, the second sun gear 22s is a fourth rotary element of the automatic transmission 20, the second carrier 22c is a fifth rotary element of the automatic transmission 20, and the second ring gear 22r is a sixth rotary element of the automatic transmission 20. Accordingly, the second planetary gear 22 has the fourth rotary element, the fifth rotary element, and the sixth rotary element of the automatic transmission 20 which are sequentially arranged at the intervals corresponding to the gear ratio $\lambda 2$ on the speed diagram.

Moreover, the four rotary elements of the Ravigneaux type planetary gear mechanism 25, namely the fourth sun gear 24s as the fixable element, the third carrier 23c as the input element, the third ring gear 23r as the first output element, and the third sun gear 23s as the second output element, are arranged in this order from the left in the figure at intervals corresponding to the gear ratio $\lambda 3$ of the double-pinion type third planetary gear and the gear ratio $\lambda 4$ of the single-pinion type fourth planetary gear on the speed diagram of the Ravigneaux type planetary gear mechanism 25 (the speed diagram on the right side in FIG. 2). In the present disclosure, according to the order in which the rotary elements are arranged, the fourth sun gear 24s is a seventh rotary element of the automatic transmission 20, the third carrier 23c is an eighth rotary element of the automatic transmission 20, the third ring gear 23r is a ninth rotary element of the automatic transmission 20, and the third sun gear 23s is a tenth rotary element of the automatic transmission 20. Accordingly, the Ravigneaux type planetary gear mechanism 25 has the seventh rotary element, the eighth rotary element, the ninth rotary element, and the tenth rotary element of the automatic transmission 20 which are sequentially arranged at the intervals corresponding to the gear ratios $\lambda 3$, $\lambda 4$ on the speed diagram.

In the automatic transmission 20, the clutches C1 to C4 and the brakes B1, B2 are engaged or disengaged as shown in FIG. 3 to change connection of the first to tenth rotary elements (virtually a total of nine rotary elements because the first rotary element and the fourth rotary element are constantly coupled together), so that ten power transmission paths can be provided in the forward rotation direction and one power transmission path can be provided in the reverse rotation direction from the input shaft 20i to the output shaft 20o. Namely, first to tenth forward speeds and a reverse speed can be provided.

Specifically, the first forward speed is attained by engaging the clutches C1, C2 and the brake B2 and disengaging the remaining clutches C3, C4 and the brake B1. That is, when attaining the first forward speed, the first sun gear 21s of the first planetary gear 21 and the second sun gear 22s of the second planetary gear 22 are connected to the third ring gear 23r (the first output element) of the Ravigneaux type planetary gear mechanism 25 by the clutch C1. The first sun gear 21s of the first planetary gear 21 and the second sun gear 22s of the second planetary gear 22 are connected to the third sun gear 23s (the second output element) of the Ravigneaux type planetary gear mechanism 25 by the clutch C2. Moreover, the second ring gear 22r (the fixable element) of the second planetary gear 22 is held stationary to the transmission case 11 by the brake B2 so as not to allow the second ring gear 22r to rotate. In the present embodiment (in the case where the gear ratios of the first and second planetary gears 21, 22 and the third and fourth planetary gears are $\lambda 1=0.277$, $\lambda 2=0.244$, $\lambda 3=0.488$, and $\lambda 4=0.581$; the same applies to the following description), the gear ratio (the rotational speed of the input shaft 20i/the rotational speed of the output shaft 20o) $\gamma 1$ at the first forward speed is $\gamma 1=5.091$.

The second forward speed is attained by engaging the clutch C1 and the brakes B1, B2 and disengaging the remaining clutches C2, C3, C4. That is, when attaining the second forward speed, the first sun gear 21s of the first planetary gear 21 and the second sun gear 22s of the second planetary gear 22 are connected to the third ring gear 23r (the first output element) of the Ravigneaux type planetary gear mechanism 25 by the clutch C1. The fourth sun gear 24s (the fixable element) of the Ravigneaux type planetary gear mechanism 25 is held stationary to the transmission case 11 by the brake B1 so as not to allow the fourth sun gear 24s to rotate. Moreover, the second ring gear 22r (the fixable element) of the second planetary gear 22 is held stationary to the transmission case 11 by the brake B2 so as not to allow the second ring gear 22r to rotate. In the present embodiment, the gear ratio $\gamma 2$ at the second forward speed is $\gamma 2=3.219$. The step ratio between the first and second forward speeds is $\gamma 1/\gamma 2=1.581$.

The third forward speed is attained by engaging the clutch C2 and the brakes B1, B2 and disengaging the remaining clutches C1, C3, C4. That is, when attaining the third forward speed, the first sun gear 21s of the first planetary gear 21 and the second sun gear 22s of the second planetary gear 22 are connected to the third sun gear 23s (the second output element) of the Ravigneaux type planetary gear mechanism 25 by the clutch C2. The fourth sun gear 24s (the fixable element) of the Ravigneaux type planetary gear mechanism 25 is held stationary to the transmission case 11 by the brake B1 so as not to allow the fourth sun gear 24s to rotate. Moreover, the second ring gear 22r (the fixable element) of the second planetary gear 22 is held stationary to the transmission case 11 by the brake B2 so as not to allow the second ring gear 22r to rotate. In the present embodiment, the gear ratio $\gamma 3$ at the third forward speed is $\gamma 3=2.324$. The step ratio between the second and third forward speeds is $\gamma 2/\gamma 3=1.385$.

The fourth forward speed is attained by engaging the clutch C4 and the brakes B1, B2 and disengaging the remaining clutches C1, C2, C3. That is, when attaining the fourth forward speed, the first ring gear 21r (the output element) of the first planetary gear 21 is connected to the output shaft 20o by the clutch C4. The fourth sun gear 24s (the fixable element) of the Ravigneaux type planetary gear mechanism 25 is held stationary to the transmission case 11 by the brake B1 so as not to allow the fourth sun gear 24s to rotate. Moreover, the second ring gear 22r (the fixable element) of the second planetary gear 22 is held stationary to the transmission case 11 by the brake B2 so as not to allow the second ring gear 22r to rotate. In the present embodiment, the gear ratio $\gamma 4$ at the fourth forward speed is $\gamma 4=1.886$. The step ratio between the third and fourth forward speeds is $\gamma 3/\gamma 4=1.232$.

The fifth forward speed is attained by engaging the clutches C2, C4 and the brake B1 and disengaging the remaining clutches C1, C3 and the brake B2. That is, when attaining the fifth forward speed, the first sun gear 21s of the first planetary gear 21 and the second sun gear 22s of the second planetary gear 22 are connected to the third sun gear 23s (the second output element) of the Ravigneaux type planetary gear mechanism 25 by the clutch C2. The first ring gear 21r (the output element) of the first planetary gear 21 is connected to the output shaft 20o by the clutch C4. Moreover, the fourth sun gear 24s (the fixable element) of the Ravigneaux type planetary gear mechanism 25 is held stationary to the transmission case 11 by the brake B1 so as not to allow the fourth sun gear 24s to rotate. In the present embodiment, the gear ratio $\gamma 5$ at the fifth forward speed is $\gamma 5=1.491$. The step ratio between the fourth and fifth forward speeds is $\gamma 4/\gamma 5=1.265$.

The sixth forward speed is attained by engaging the clutches C1, C4 and the brake B1 and disengaging the remaining clutches C2, C3 and the brake B2. That is, when attaining the sixth forward speed, the first sun gear 21s of the first planetary gear 21 and the second sun gear 22s of the second planetary gear 22 are connected to the third ring gear 23r (the first output element) of the Ravigneaux type planetary gear mechanism 25 by the clutch C1. The first ring gear 21r (the output element) of the first planetary gear 21 is connected to the output shaft 20o by the clutch C4. Moreover, the fourth sun gear 24s (the fixable element) of the Ravigneaux type planetary gear mechanism 25 is held stationary to the transmission case 11 by the brake B1 so as not to allow the fourth sun gear 24s to rotate. In the present embodiment, the gear ratio $\gamma 6$ at the sixth forward speed is $\gamma 6=1.192$. The step ratio between the fifth and sixth forward speeds is $\gamma 5/\gamma 6=1.251$.

The seventh forward speed is attained by engaging the clutches C1, C3, C4 and disengaging the remaining clutch C2 and the brakes B1, B2. That is, when attaining the seventh forward speed, the first sun gear 21s of the first planetary gear 21 and the second sun gear 22s of the second planetary gear 22 are connected to the third ring gear 23r (the first output element) of the Ravigneaux type planetary gear mechanism 25 by the clutch C1. The second ring gear 22r of the second planetary gear 22 is connected to the third ring gear 23r (the first output element) of the Ravigneaux type planetary gear mechanism 25 by the clutch C3. Moreover, the first ring gear 21r (the output element) of the first planetary gear 21 is connected to the output shaft 20o by the clutch C4. In the present embodiment, the gear ratio $\gamma 7$ at the seventh forward speed is $\gamma 7=1.000$. The step ratio between the sixth and seventh forward speeds is $\gamma 6/\gamma 7=1.192$.

The eighth forward speed is attained by engaging the clutches C3, C4 and the brake B1 and disengaging the remaining clutches C1, C2 and the brake B2. That is, when attaining the eighth forward speed, the second ring gear 22r of the second planetary gear 22 is connected to the third ring gear 23r (the first output element) of the Ravigneaux type planetary gear mechanism 25 by the clutch C3. The first ring gear 21r (the output element) of the first planetary gear 21 is connected to the output shaft 20o by the clutch C4. Moreover, the fourth sun gear 24s (the fixable element) of the Ravigneaux type planetary gear mechanism 25 is held stationary to the transmission case 11 by the brake B1 so as not to allow the fourth sun gear 24s to rotate. In the present embodiment, the gear ratio $\gamma 8$ at the eighth forward speed is $\gamma 8=0.785$. The step ratio between the seventh and eighth forward speeds is $\gamma 7/\gamma 8=1.273$.

The ninth forward speed is attained by engaging the clutches C1, C3 and the brake B1 and disengaging the remaining clutches C2, C4 and the brake B2. That is, when attaining the ninth forward speed, the first sun gear 21s of the first planetary gear 21 and the second sun gear 22s of the second planetary gear 22 are connected to the third ring gear 23r (the first output element) of the Ravigneaux type planetary gear mechanism 25 by the clutch C1. The second ring gear 22r of the second planetary gear 22 is connected to the third ring gear 23r (the first output element) of the Ravigneaux type planetary gear mechanism 25 by the clutch C3. Moreover, the fourth sun gear 24s (the fixable element) of the Ravigneaux type planetary gear mechanism 25 is held stationary to the transmission case 11 by the brake B1 so as not to allow the fourth sun gear 24s to rotate. In the present embodiment, the gear ratio γ9 at the ninth forward speed is γ9=0.632. The step ratio between the eighth and ninth forward speeds is γ8/γ9=1.242.

The tenth forward speed is attained by engaging the clutches C2, C3 and the brake B1 and disengaging the remaining clutches C1, C4 and the brake B2. That is, when attaining the tenth forward speed, the first sun gear 21s of the first planetary gear 21 and the second sun gear 22s of the second planetary gear 22 are connected to the third sun gear 23s (the second output element) of the Ravigneaux type planetary gear mechanism 25 by the clutch C2. The second ring gear 22r of the second planetary gear 22 is connected to the third ring gear 23r (the first output element) of the Ravigneaux type planetary gear mechanism 25 by the clutch C3. Moreover, the fourth sun gear 24s (the fixable element) of the Ravigneaux type planetary gear mechanism 25 is held stationary to the transmission case 11 by the brake B1 so as not to allow the fourth sun gear 24s to rotate. In the present embodiment, the gear ratio γ10 at the tenth forward speed is γ10=0.588. The step ratio between the ninth and tenth forward speeds is γ9/γ10=1.076. The spread (the gear ratio range=the gear ratio γ1 at the first forward speed as the lowest shift speed/the gear ratio γ10 at the tenth forward speed as the highest shift speed) of the automatic transmission 20 is γ1/γ10=8.660.

The reverse speed is attained by engaging the clutches C2, C3 and the brake B2 and disengaging the remaining clutches C1, C4 and the brake B1. That is, when attaining the reverse speed, the first sun gear 21s of the first planetary gear 21 and the second sun gear 22s of the second planetary gear 22 are connected to the third sun gear 23s (the second output element) of the Ravigneaux type planetary gear mechanism 25 by the clutch C2. The second ring gear 22r of the second planetary gear 22 is connected to the third ring gear 23r (the first output element) of the Ravigneaux type planetary gear mechanism 25 by the clutch C3. Moreover, the second ring gear 22r (the fixable element) of the second planetary gear 22 is held stationary to the transmission case 11 by the brake B2 so as not to allow the second ring gear 22r to rotate. In the present embodiment, the gear ratio γrev at the reverse speed is γrev=−4.860. The step ratio between the first forward speed and the reverse speed is |γrev/γ1|=0.955.

As described above, the automatic transmission 20 can provide the first to tenth forward speeds and the reverse speed by engagement and disengagement of the clutches C1 to C4 and the brakes B1, B2. As a result, in the automatic transmission 20, the spread can be increased (in the present embodiment, 8.660), and fuel economy of the vehicle especially at high vehicle speeds and acceleration performance at each shift speed can be improved. Moreover, proper step ratios can be achieved (an increase in step ratio can be restrained), and shift feeling can be improved. The automatic transmission 20 can therefore satisfactorily improve both fuel economy and drivability of the vehicle.

The automatic transmission 20 attains the first to tenth forward speeds and the reverse speed by engaging three of the six engagement elements, i.e., the clutches C1 to C4 and the brakes B1, B2, and disengaging the remaining three engagement elements. The number of engagement elements to be disengaged to attain a shift speed can thus be reduced as compared to, e.g., transmissions that attain a plurality of shift speeds by engaging two of six engagement elements, i.e., clutches and brakes, and disengaging the remaining four engagement elements. This can reduce drag loss that is caused by slight contact between members in the engagement elements disengaged to attain a shift speed and can further improve power transmission efficiency of the automatic transmission 20.

Moreover, in the automatic transmission 20, like the third carrier 23c (the input element) of the Ravigneaux type planetary gear mechanism 25, the first carrier 21c (the second rotary element) of the first planetary gear 21 is constantly coupled to the input shaft 20i via the intermediate shaft 20m. When attaining the fourth to eighth forward speeds, the first ring gear 21r (the third rotary element) of the first planetary gear 21 is connected to the output shaft 20o (the second carrier 22c of the second planetary gear 22) by the clutch C4. This can reduce torque allocated to the clutch C4 as compared to a clutch that selectively connects the first carrier (the second rotary element) to the input shaft in, e.g., a conventional transmission (see FIGS. 2 and 3 of the specification of U.S. Pat. No. 8,202,190) in which the first ring gear (the third rotary element) of the first planetary gear together with the second carrier (the fifth rotary element) of the second planetary gear is constantly coupled to the output shaft, and the first carrier (the second rotary element) of the first planetary gear is selectively connected to the input shaft.

That is, in the automatic transmission 20, the first carrier 21c of the first planetary gear 21 is the second rotary element that is constantly coupled to the input shaft 20i, and the first ring gear 21r of the first planetary gear 21 is the third rotary element that is selectively connected to the output shaft 20o by the clutch C4. This can reduce the torque to be transmitted via the engaged clutch C4 to $1/(1+\lambda 1)$ as compared to the clutch of the conventional transmission which selectively connects the first carrier to the input shaft. Accordingly, in the automatic transmission 20, the torque allocated to the clutch C4 can therefore be satisfactorily reduced, and the clutch C4 can be made compact in at least one of the axial and radial directions. As a result, according to the automatic transmission 20, both power transmission efficiency and drivability can be improved and an increase in overall size of the device can be restrained.

Since the first and second planetary gears 21, 22 are single-pinion type planetary gears, meshing loss between the rotary elements in the first and second planetary gears 21, 22 can be reduced and the power transmission efficiency of the automatic transmission 20 can further be improved as compared to the case where, e.g., at least one of the first and second planetary gears 21, 22 is a double-pinion type planetary gear. Moreover, the number of parts can be reduced, so that an increase in overall weight of the device can be restrained and the ease of assembly can be improved. As in the automatic transmission 20, the use of the Ravigneaux type planetary gear mechanism 25 that is a compound planetary gear train formed by combination of the double-pinion type third planetary gear and the single-pinion type fourth planetary gear reduces the number of parts, so that an increase in overall weight of the device can be restrained and the ease of assembly can be improved.

Figure 4:
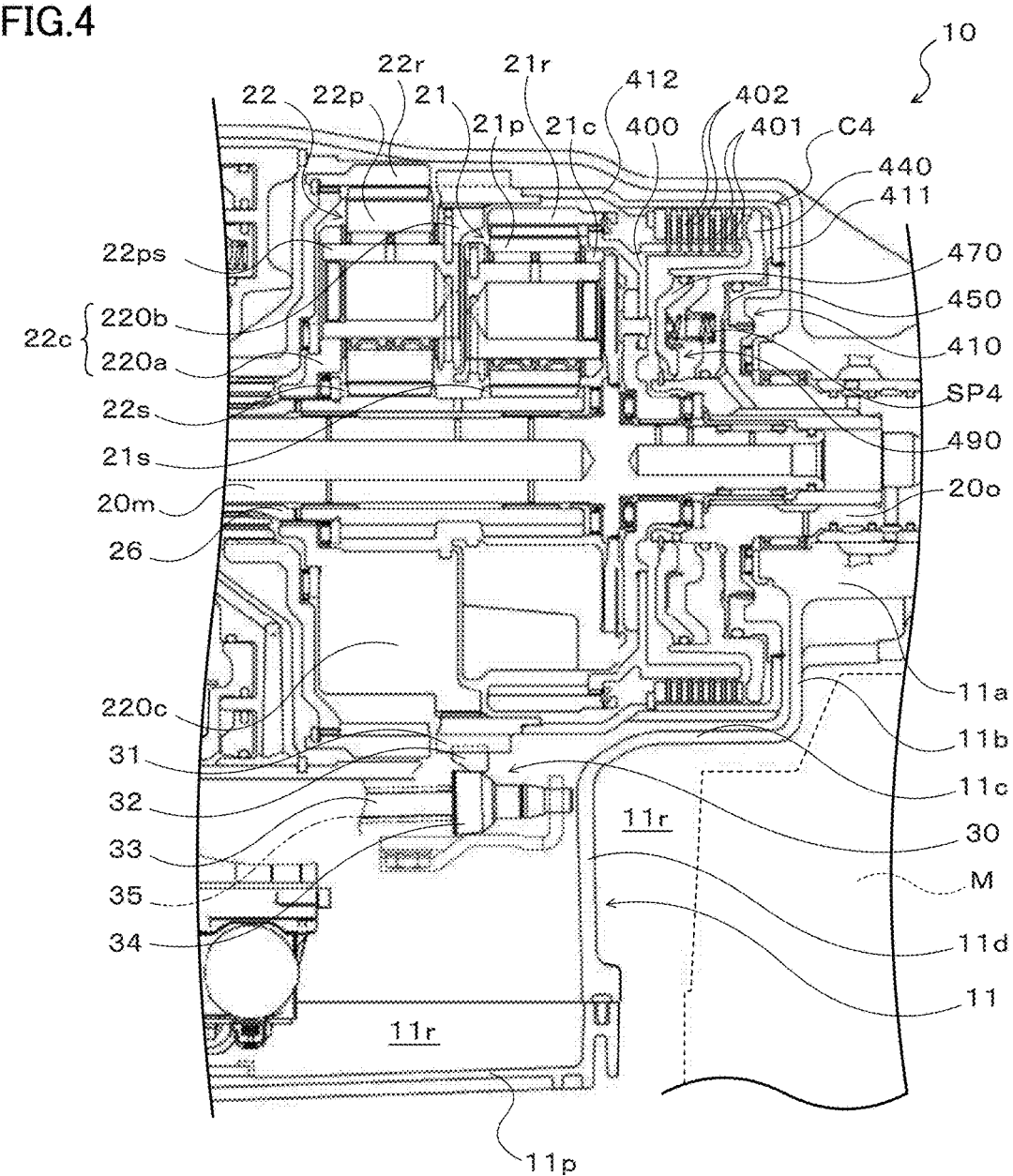
FIG. 4 is an enlarged sectional view of a main part of the power transmission device in FIG. 1.

FIG. 4 is an enlarged sectional view of a main part of the power transmission device 10. This figure shows the structure of the power transmission device 10 around the first and second planetary gears 21, 22, the clutch C4, the parking lock device 30, etc.

As shown in FIG. 4, the transmission case 11 has a shape according to the shape of a mount M that is interposed between the transmission case 11 and a vehicle body to absorb vibration. Specifically, the upper part of the transmission case 11 is formed around the first and second planetary gears 21, 22 and the clutch C4 so as to extend along the outer peripheries of the first and second planetary gears 21, 22 and the clutch C4, the end of the clutch C4 facing the rear side of the vehicle (the right side in FIG. 4), the outer peripheral surface of the output shaft 20o, etc. The transmission case 11 has a hydraulic oil reservoir portion 11o (space) below the first and second planetary gears 21, 22 in order to store hydraulic oil. The lower part of the transmission case 11 is therefore formed to extend along the outer periphery of the clutch C4, the end of the clutch C4 facing the rear side of the vehicle, the outer peripheral surface of the output shaft 20o, etc. and to extend radially outward (downward) near the boundary between the first planetary gear 21 and the clutch C4 in the axial direction.

That is, the transmission case 11 has a small diameter tubular portion 11a that rotatably supports the output member 20o via a bearing, an annular wall portion 11b extended radially outward from the small diameter tubular portion 11a, a large diameter tubular portion 11c extended in a tubular shape in the axial direction from the outer periphery of the annular wall portion 11b toward the front of the vehicle so as to surround at least a part of the first planetary gear 21 and at least a part of the clutch C4, and an end wall portion 11d extended radially outward (downward in the power transmission device 10) from the lower part of the large diameter tubular portion 11c. The upper part and the side part of the large diameter tubular portion 11c extend toward the front of the vehicle, and an opening is defined in the lower part of the large diameter tubular portion 11c by the side part of the large diameter tubular portion 11c, the end wall portion 11d, etc.

An oil pan 11p is fixed to the lower part of the large diameter tubular portion 11c (the end wall portion 11d etc.) so as to close the opening to define the hydraulic oil reservoir portion 11o. The transmission case 11 further has a recess 11r that is formed below the clutch C4 and the first planetary gear 21 by a part of the large diameter tubular portion 11c and the end wall portion 11d. In the present embodiment, the mount M is fastened (fixed) to a predetermined position on the transmission case 11 (e.g., the small diameter tubular portion 11a), and as shown in FIG. 4, is fastened (fixed) to the vehicle body (a cross member etc.) so as to at least partially overlap the small diameter tubular portion 11a, the annular wall portion 11b, and the large diameter tubular portion 11c as viewed in the radial direction of the transmission case 11.

As described above, the second planetary gear 22 has the second sun gear 22s, the second ring gear 22r, the plurality of second pinion gears 22p, and the second carrier 22c. As shown in FIG. 4, the second carrier 22c includes a first shaft support portion 220a that supports one end (the left end in FIG. 4) of each of a plurality of second pinion shafts 22ps inserted through each of the plurality of second pinion gears 22p, a second shaft support portion 220b that is located on the output shaft 20o side (the right side in FIG. 4) of the first shaft support portion 220a and supports the other end (the right end in FIG. 4) of each of the plurality of second pinion shafts 22ps, and a bridge portion 220c that connects the first and second shaft support portions 220a, 220b. The second carrier 22c thus has high rigidity by itself. As shown in the figure, the first shaft support portion 220a located on the opposite side from the output shaft 20o is rotatably supported by the intermediate shaft 20m, which is constantly coupled to the input shaft 20i, via a sleeve or a radial bearing, a rotary member 26 formed by integrating the first and second sun gears 21s, 22s, a plurality of bushes, etc.

As shown in FIG. 4, one end (the right end in FIG. 4) of the intermediate shaft 20m is rotatably supported by the small diameter tubular portion 11a of the transmission case 11 via a radial bearing, the output shaft 20o, etc. Similarly, the other end (not shown) of the intermediate shaft 20m is rotatably supported by the transmission case 11 via a bearing, a tubular member, etc. Accordingly, the second carrier 22c is rotatably supported by the intermediate shaft 20m as a central shaft that is rotatably supported by the transmission case 11. The first and second shaft support portions 220a, 220b and the bridge portion 220c of the second carrier 22c may be molded as a single-piece member by casting etc. The other of the first and second shaft support portions 220a, 220b as a carrier cover may be fixed to a carrier body molded as a single-piece member comprised of one of the first and second shaft support portions 220a, 220b and the bridge portion 220c.

As shown in FIG. 4, the clutch C4 together with the first planetary gear 21 is placed between the second planetary gear 22 and the output shaft 20o in the axial direction, and the clutch C4 is located closer to the output shaft 20o than the first planetary gear 21 is. The clutch C4 has a clutch hub 400, a clutch drum 410, a plurality of friction plates 401, a plurality of separator plates 402 (friction engagement plates) arranged alternately with the friction plates 401, a backing plate, a piston 440 that presses the friction plates 401 and the separator plates 402 to frictionally engages the friction plates 401 with the separator plates 402, a plurality of return springs SP4 that bias the piston 440 so that the piston 440 is separated from the friction plates 401 and the separator plates 402, and an annular cancel plate 470.

The clutch hub 400 is rotatably supported by the intermediate shaft 20m via a sleeve or a radial bearing, and is supported in the axial direction by a flange portion of the intermediate shaft 20m and the output shaft 20o via two thrust bearings, namely front and rear thrust bearings. The clutch hub 400 is constantly coupled (fixed) to the first ring gear 21r of the first planetary gear 21 via splines and a snap ring. The clutch drum 410 has an annular wall portion 411 fixed to a larger diameter portion of the output shaft 20o by welding etc., and a tubular portion 412 formed in the shape of a bottomed cylinder having its one end (the left end in FIG. 4) opened, and joined to the outer periphery of the annular wall portion 411 by welding etc., and extending in the axial direction of the output shaft 20o etc.

The inner periphery of each of the friction plates 401 of the clutch C4 is fitted in a spline formed in the outer peripheral surface of the clutch hub 400 and is movably supported by the clutch hub 400. The outer periphery of each of the separator plates 402 of the clutch C4 is fitted in a spline formed in the inner peripheral surface of the tubular portion 412 of the clutch drum 410 and is movably supported by the clutch drum 410.

The piston 440 is axially movably supported by the output shaft 20o so as to be located on the first planetary gear 21 side (the front side of the vehicle) of the annular wall portion 411 in the tubular portion 412 of the clutch drum 410. The cancel plate 470 is fixed to the output shaft 20o with a snap ring so as to be located on the first planetary gear 21 side (the front side of the vehicle) of the piston 440. The piston 440 together with the clutch drum 410 (the annular wall portion 411 and the tubular portion 412) as an oil chamber defining portion and the output shaft 20o defines an engagement oil chamber 450 of the clutch C4 to which an engagement oil pressure (hydraulic oil) is supplied. Moreover, the cancel plate 470 together with the piston 440 and the output shaft 20o defines a centrifugal oil pressure cancel chamber 490 for cancelling a centrifugal oil pressure that is generated in the engagement oil chamber 450.

All the oil chambers of the clutch C4, namely the engagement oil chamber 450 and the centrifugal oil pressure cancel chamber 490, are thus defined by the clutch drum 410, the piston 440, and the cancel plate 470 which rotate together with the second carrier 22c of the second planetary gear 22 and the output shaft 20o. The return springs SP4 are disposed at intervals in the circumferential direction in the centrifugal oil pressure cancel chamber 490 so as to be located between the piston 440 and the cancel plate 470. Instead of a plurality of coil springs, a single leaf spring may be used as the return springs SP4 of the clutch C4. The output shaft 20o is rotatably supported by the transmission case 11 via a sleeve, a radial bearing, or a thrust bearing.

The parking lock device 30 is configured as a well-known parking lock mechanism that performs a parking lock operation of locking the output shaft 20o of the automatic transmission 20 and a parking unlock operation of unlocking the output shaft 20o of the automatic transmission 20. As shown in FIG. 4, the parking lock device 30 includes a parking gear 31, a parking pawl 32 that can be engaged with the parking gear 31, a parking rod 33 that can advance and withdraw with respect to the parking pawl 32, a tubular cam member 34 that moves the parking pawl 32 toward the parking gear 31 according to the advancing and withdrawing movement of the parking rod 33, a cam spring 35 that has its one end supported by the parking rod 33 and that biases the cam member 34 such that engagement between the parking gear 31 and the parking pawl 32 is retained, and a detent mechanism, not shown, that is coupled to the parking rod 33 and that is operated either manually or by power from an actuator (an electric actuator, a hydraulic actuator, etc.). In the present embodiment, as shown in FIG. 4, the parking pawl 32, the parking rod 33, the cam member 34, etc. are placed below (below in the power transmission device 10) the parking gear 31 so as to overlap the end wall portion 11d of the transmission case 11 as viewed in the axial direction of the power transmission device 10. As shown in FIG. 4, the parking pawl 32, the parking rod 33, the cam member 34, etc. face the mount M in the axial direction with the end wall portion 11d interposed therebetween.

The parking gear 31 is an annular member having a plurality of external teeth and is disposed in the tubular portion 412 between the annular wall portion 411 and the second carrier 22c. That is, in the power transmission device 10, the transmission case 11 is formed so as not to interfere with the mount M. The parking gear 31 therefore cannot be coupled (fixed) to the tubular portion 412 of the clutch drum 410 so as to be located radially outward of the annular wall portion 411. Accordingly, in the present embodiment, the parking gear 31 is placed radially outward of the second shaft support portion 220b of the second carrier 22c which is located on the output shaft 20o side, and the inner periphery of the parking gear 31 is coupled (fixed) to the outer periphery of the second shaft support portion 220b via splines.

One axial end (the right end in FIG. 4) of the parking gear 31 is coupled (fixed) to the open end of the tubular portion 412 of the clutch drum 410 via splines or an annular fitting portion in the shape of comb teeth. The second carrier 22c (the second shaft support portion 220b) is thus coupled to the output shaft 20o via the parking gear 31 and the clutch drum 410 of the clutch C4 so as to rotate together with the output shaft 20o. The second carrier 22c is rotatably supported by the transmission case 11 via the intermediate shaft 20m and is rotatably supported by the transmission case 11 via the clutch drum 410 (the tubular portion 412 and the annular wall portion 411) and the output shaft 20o.

As described above, the parking gear 31 is located radially outward of the shaft support portion 220b and is coupled to the shaft support portion 220b. The parking gear 31 is thus satisfactorily restrained from being tilted in the direction perpendicular to its axis during, e.g., the parking lock operation of locking the output shaft 20o by engaging the parking pawl 32 with the parking gear 31. Since the parking gear 31 is supported by the transmission case 11 via both the intermediate shaft 20m and the output shaft 20o, the orientation of the parking gear 31 during the parking lock operation etc. can be stabilized as compared to the configuration in which the parking gear 31 is supported by only the output shaft 20o.

Moreover, the second carrier 22c and the clutch drum 410 fixed to the output shaft 20o are coupled together via the parking gear 31. The parking gear 31 thus functions not only as a component of the parking lock device 30 but also as a transmission member that transmits power from the second carrier 22c to the output shaft 20o while the vehicle is traveling. This can restrain an increase in weight as compared to, e.g., the configuration in which the parking gear 31 is coupled (fixed) to only the second carrier 22c or the clutch drum 410.

In the power transmission device 10, the transmission case 11 accommodating the first and second planetary gears 21, 22, the parking lock device 30, etc. has the small diameter tubular portion 11a rotatably supporting the output shaft 20o, the annular wall portion 11b extended radially outward from the small diameter tubular portion 11a, and the large diameter tubular portion 11c extended in the axial direction from the outer periphery of the annular wall portion 11b. Moreover, the large diameter tubular portion 11c of the transmission case 11 surrounds at least a part of the first planetary gear 21 and at least a part of the clutch C4. The small diameter tubular portion 11a, the annular wall portion 11b, and the large diameter tubular portion 11c of the transmission case 11 at least partially overlaps the mount M fixed to the vehicle body, as viewed in the radial direction of the power transmission device 10. This can restrain interference between the transmission case 11 and the mount M without changing the mounting position of the mount M in the vehicle body.

Moreover, the second carrier 22c of the second planetary gear 22 is rotatably supported by the intermediate shaft 20m as the central shaft rotatably supported by the transmission case 11, and is coupled to the output shaft 20o so as to rotate together with the output shaft 20o. The parking gear 31 is coupled to the outer periphery of the second shaft support portion 220b of the second carrier 22c of the second planetary gear 22 so as to rotate together with the second carrier 22c. That is, the parking gear 31 is disposed on the second carrier 22c that is stably supported by the transmission case 11 via the intermediate shaft 20m (and the output shaft 20o) such that the axis of the second carrier 22c is not tilted, and that has high rigidity. This allows the parking pawl 32, the parking rod 33, the cam member 34, the cam spring 35, etc. to be placed in the space above the hydraulic oil reservoir portion 11o. Accordingly, flexibility in selecting the mounting position of the parking lock device 30, i.e., the parking pawl 32 etc., can be increased, and the parking gear 31 can be satisfactorily restrained from being tilted during the parking lock operation. As a result, in the power transmission device 10, interference between the transmission case 11 and the mount M can be suppressed and the orientation of the parking gear 31 during the parking lock operation can be stabilized.

The second carrier 22c includes the first shaft support portion 220a that supports the one end of each of the second pinion shafts 22ps inserted through each of the second pinion gears 22p of the second planetary gear 22, and the second shaft support portion 220b that is located on the output shaft 20o side of the first shaft support portion 220a and supports the other end of each of the second pinion shafts 22ps. Moreover, the parking gear 31 is coupled to the outer periphery of the second shaft support portion 220b, and is coupled to the output shaft 20o so as to rotate together with the output shaft 20o. Accordingly, when the parking pawl 32 is engaged with the parking gear 31, the parking gear 31 can be stably supported by the second shaft support portion 220b of the second carrier 22c so as not to be tilted. In addition, interference between the parking gear 31 and the second ring gear 22r of the second planetary gear 22 which is placed such that the second carrier 22c is surrounded can be restrained, and the second carrier 22c can be coupled to the output shaft 20o via the parking gear 31.

Moreover, the first shaft support portion 220a of the second carrier 22c is rotatably supported by the intermediate shaft 20m, and the intermediate shaft 20m is supported by the transmission case 11 via the output shaft 20o etc. Since both ends of the second carrier 22c are thus supported by the transmission case 11, the second carrier 22c can be very stably supported so that its axis is not tilted.

The clutch C4 includes the clutch drum 410 and the plurality of separator plates (friction engagement plates) 402 each having its outer periphery fitted in the tubular portion 412 of the clutch drum 410. Moreover, the clutch drum 410 has the annular wall portion 411 coupled to the output shaft 20o such that the annular wall portion 411 rotates together with the output shaft 20o, and the tubular portion 412 extended in the axial direction from the outer periphery of the annular wall portion 411 and coupled to the parking gear 31 such that the tubular portion 412 rotates together with the parking gear 31. The first planetary gear 21 is placed between the second planetary gear 22 and the clutch C4 in the axial direction and is surrounded by the parking gear 31 and the tubular portion 412 of clutch drum 410. Moreover, the large diameter tubular portion 11c of the transmission case 11 surrounds the clutch C4. As described above, in the power transmission device 10, the parking gear 31 can be stably supported by the second carrier 22c (the second shaft support portion 220b) even if the parking gear 31 is pressed by the parking pawl 32 during the parking lock operation. This can satisfactorily restrain bending (deformation) of the tubular portion 412 of the clutch drum 410 in which the outer peripheries of the plurality of separator plates (friction engagement plates) 402 are fitted.

The use of the above configuration in the power transmission device 10 can restrain interference between the mount (vibration isolating rubber) M and the transmission case 11 and can stabilize the orientation of the parking gear 31 during the parking lock operation even if the mount M having a larger size is disposed in order to restrain transmission of vibration of the automatic transmission 20 to the vehicle body. A vehicle body-side constituent member fixed to the vehicle body such that the vehicle body-side constituent member at least partially overlaps the small diameter tubular portion 11a, the annular wall portion 11b, and the large diameter tubular portion 11c as viewed in the radial direction of the transmission case 11 is not limited to the mount M. That is, the vehicle body-side constituent member may be a muffler to be connected to an exhaust pipe of the engine, etc.

In the power transmission device 10, the second carrier 22c and the clutch drum 410 fixed to the output shaft 20o are coupled together via the parking gear 31. However, the present disclosure is not limited to this. That is, the second carrier 22c and the clutch drum 410 may be coupled together without via the parking gear 31, and for example, the parking gear 31 may be coupled to only one of the second carrier 22c (the second shaft support portion 220b) and the tubular portion 412 at a position near the second shaft support portion 220b.

Figure 5:
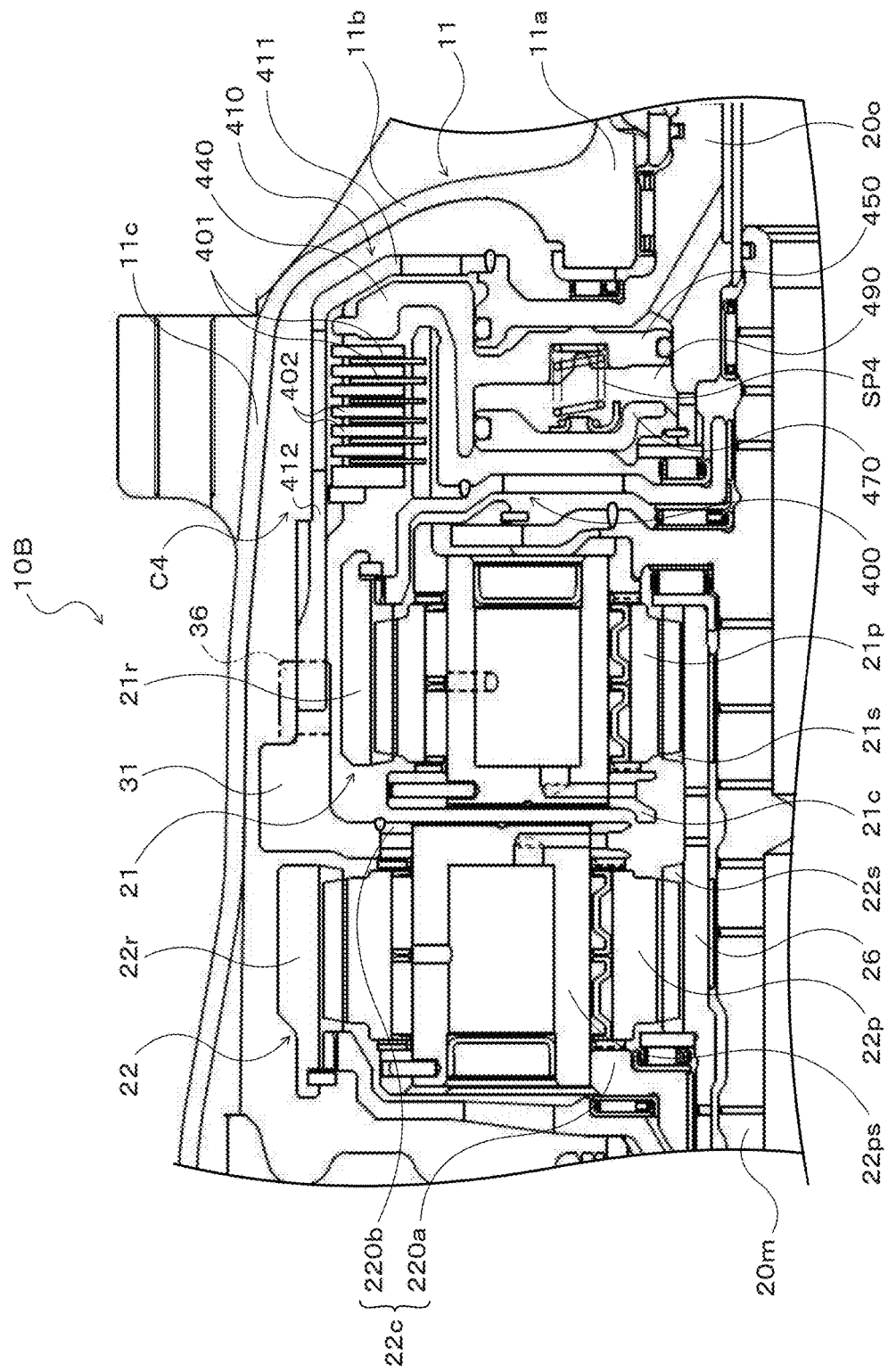
FIG. 5 is an enlarged sectional view of a power transmission device according to another exemplary embodiment.

In the power transmission device 10, the inner periphery of the parking gear 31 is coupled to the outer periphery of the second shaft support portion 220b of the second carrier 22c via the splines. However, the present disclosure is not limited to this. That is, in a power transmission device 10B shown in FIG. 5, the parking gear 31 is fixed (coupled) to the outer periphery of the second shaft support portion 220b by welding. In this case, the parking gear 31 and the open end of the tubular portion 412 of the clutch hub 400 may be coupled via a fitting portion that allows the parking gear 31 and the clutch hub 400 to move relative to each other in the radial direction and that allows power to be transmitted between the parking gear 31 and the clutch hub 400 in the rotation direction, in order to ensure the self-aligning function of the second planetary gear 22. However, in the case where the self-aligning function of the second planetary gear 22 is sufficiently ensured even if the parking gear 31 and the clutch hub 400 are not allowed to move relative to each other in the radial direction, a ring member 36 that restricts radial relative movement between the parking gear 31 and the clutch hub 400 may be attached to the parking gear 31 and the tubular portion 412 so as to cover the coupling portion between the parking gear 31 and the tubular portion 412, as shown by an alternate long and short dash line in FIG. 5. This allows both the second carrier 22c and the output shaft 20o to receive the load that is applied from the parking pawl 32 to the parking gear 31 during the parking lock operation.

Moreover, in the automatic transmission 20 of the power transmission device 10, at least any of the clutches C1 to C4 and the brakes B1, B2 may be a meshing engagement element such as a dog clutch or a dog brake. For example, in the automatic transmission 20, a dog brake may be used as the brake B2 that is continuously engaged to form the first to fourth forward speeds and that is engaged to form the reverse speed. In the automatic transmission 20, the gear ratios λ1 to λ4 in the first and second planetary gears 21, 22 and the Ravigneaux type planetary gear mechanism 25 are not limited to those shown in the above description. Moreover, in the automatic transmission 20, at least any of the first and second planetary gears 21, 22 may be a double-pinion type planetary gear, and the Ravigneaux type planetary gear mechanism 25 may be replaced with, e.g., a compound planetary gear train such as a Simpson type or CR-CR type planetary gear train. The automatic transmission 20 may be modified to a transmission that is mounted on a front wheel drive vehicle.

As described above, the power transmission device according to the present disclosure is a power transmission device including a multi-speed transmission that has a planetary gear and that shifts power transmitted from a driving source of a vehicle to an input member to transmit the shifted power to an output member, a parking lock device having a parking gear and a parking pawl that can be engaged with the parking gear, and a case that accommodates the multi-speed transmission and the parking lock device, wherein the planetary gear has a carrier that is rotatably supported by a central shaft rotatably supported by the case and that is coupled to the output member such that the carrier rotates together with the output member, at least one of another planetary gear different from the planetary gear included in the multi-speed transmission and a clutch is placed between the carrier and the output member in an axial direction, the case has a small diameter tubular portion rotatably supporting the output member, an annular wall portion extended radially outward from the small diameter tubular portion, and a large diameter tubular portion extended in the axial direction from an outer periphery of the annular wall portion such that at least one of at least a part of the other planetary gear and at least a part of the clutch is surrounded, a vehicle body-side constituent member is fixed to a vehicle body of the vehicle so as to at least partially overlap the small diameter tubular portion, the annular wall portion, and the large diameter tubular portion of the case as viewed in a radial direction of the power transmission device, and the parking gear is coupled to an outer periphery of the carrier so as to rotate together with the carrier.

In this power transmission device, the case that accommodates the planetary gear and the parking lock device has the small diameter tubular portion rotatably supporting the output member, the annular wall portion extended radially outward from the small diameter tubular portion, and the large diameter tubular portion extended in the axial direction from the outer periphery of the annular wall portion. The large diameter tubular portion of the case surrounds at least one of at least a part of the other planetary gear other than the planetary gear and at least a part of the clutch. Moreover, the small diameter tubular portion, the annular wall portion, and the large diameter tubular portion of the case at least partially overlap the vehicle body-side constituent member fixed to the vehicle body, as viewed in the radial direction. This can restrain interference between the case and the vehicle body-side constituent member without changing the mounting position of the vehicle body-side constituent member in the vehicle body. The carrier of the planetary gear is rotatably supported by the central shaft rotatably supported by the case, and is coupled to the output member so as to rotate together with the output member. The parking gear is coupled to the outer periphery of the carrier of the planetary gear so as to rotate together with the carrier. That is, the parking gear is disposed on the carrier that is stably supported by the case via an intermediate shaft (and the output member) such that the axis of the carrier is not tilted, and that has high rigidity. This can increase flexibility in selecting the mounting position of the parking lock device, i.e., the parking pawl etc., and can satisfactorily restrain the parking gear from being tilted during a parking lock operation of locking the output member by engaging the parking pawl with the parking gear. As a result, in the power transmission device, interference between the case and the vehicle body-side constituent member can be suppressed and the orientation of the parking gear during the parking lock operation can be stabilized.

The carrier may include a first shaft support portion that supports one end of each of a plurality of pinion shafts inserted through each of a plurality of pinion gears of the planetary gear, and a second shaft support portion that is located on the output member side of the first shaft support portion and supports the other end of each of the plurality of pinion shafts. The parking gear may be coupled to an outer periphery of the second shaft support portion and may be coupled to the output member so as to rotate together with the output member. Accordingly, when the parking pawl is engaged with the parking gear, the parking gear can be stably supported by the second shaft support portion of the carrier so as not to be tilted. In addition, interference between the parking gear and the ring gear of the planetary gear which is placed such that the carrier is surrounded can be restrained, and the carrier can be coupled to the output member via the parking gear.

The first shaft support portion may be rotatably supported by the central shaft, and the central shaft may be supported by the case via the output member. Since both ends of the carrier are thus supported by the case, the carrier can be very stably supported such that its axis is not tilted.

Both the other planetary gear and the clutch may be placed between the carrier and the output member in the axial direction, and the clutch may connect and disconnect the carrier to and from any of rotary elements of the other planetary gear.

The clutch may include a clutch drum and a friction engagement plate having an outer periphery fitted in a tubular portion of the clutch drum, and may be able to couple one rotary element of the planetary gear to one rotary element of the other planetary gear. The clutch drum may have an annular portion that is coupled to the output member such that the annular portion rotates together with the output member, and the tubular portion that is extended in the axial direction from an outer periphery of the annular portion and that is coupled to the parking gear such that the tubular portion rotates together with the parking gear. The other planetary gear may be placed between the planetary gear and the clutch in the axial direction and may be surrounded by the tubular portion of the clutch drum. The large diameter tubular portion of the case may surround the clutch. In such a power transmission device, the parking gear can be stably supported by the carrier even if the parking gear is pressed by the parking pawl during the parking lock operation. This can satisfactorily restrain bending (deformation) of the tubular portion of the clutch drum in which the outer periphery of the friction engagement plate is fitted.

The case may have an end wall portion, which is extended downward in the power transmission device from a lower part of the large diameter tubular portion and to which an oil pan that stores hydraulic oil is fixed. The parking lock device may include a parking rod that can advance and withdraw with respect to the parking pawl, and a tubular cam member that causes the parking pawl to mesh with the parking gear according to the advancing and withdrawing movement of the parking rod. The parking pawl, the parking rod, and the cam member may be placed below the parking gear in the power transmission device so as to overlap the end wall portion as viewed in the axial direction of the power transmission device. The vehicle body-side constituent member may be placed so as to face the parking pawl, the parking rod, and the cam member in the axial direction with the end wall portion interposed therebetween.

The vehicle body-side constituent member may be a mount that is interposed between the case of the multi-speed transmission and the vehicle body to absorb vibration. The use of the above configuration can restrain interference between the mount and the case and can stabilize the orientation of the parking gear during the parking lock operation even if the mount having a larger size is disposed in order to restrain transmission of vibration of the multi-speed transmission to the vehicle body.

The multi-speed transmission may include a Ravigneaux type planetary gear mechanism having an input element, a fixable element, a first output element, and a second output element, a first planetary gear as the other planetary gear having a first rotary element, a second rotary element, and a third rotary element which are sequentially arranged at intervals corresponding to a gear ratio on a speed diagram, a second planetary gear as the planetary gear having a fourth rotary element, a fifth rotary element as the carrier, and a sixth rotary element which are sequentially arranged at intervals corresponding to a gear ratio on a speed diagram, first, second, and third clutches and a fourth clutch as the clutch, and first and second brakes. The input element of the Ravigneaux type planetary gear mechanism and the second rotary element of the first planetary gear may be constantly coupled to the input member. The first rotary element of the first planetary gear may be constantly coupled to the fourth rotary element of the second planetary gear. The fifth rotary element of the second planetary gear may be constantly coupled to the output member. The first clutch may connect and disconnect the first rotary element of the first planetary gear and the fourth rotary element of the second planetary gear, which are constantly coupled together, to and from the first output element of the Ravigneaux type planetary gear mechanism. The second clutch may connect and disconnect the first rotary element of the first planetary gear and the fourth rotary element of the second planetary gear, which are constantly coupled together, to and from the second output element of the Ravigneaux type planetary gear mechanism. The third clutch may connect and disconnect the sixth rotary element of the second planetary gear to and from the first output element of the Ravigneaux type planetary gear mechanism. The fourth clutch may connect and disconnect the fifth rotary element of the second planetary gear and the output member, which are constantly coupled together, to and from the third rotary element of the first planetary gear. The first brake may connect the fixable element of the Ravigneaux type planetary gear mechanism to a stationary member to hold the fixable element of the Ravigneaux type planetary gear mechanism stationary, and may disconnect the fixable element of the Ravigneaux type planetary gear mechanism from the stationary member. The second brake may connect the sixth rotary element of the second planetary gear to the stationary member to hold the sixth rotary element of the second planetary gear stationary, and may disconnect the sixth rotary element of the second planetary gear from the stationary member.

The multi-speed transmission of this power transmission device includes the Ravigneaux type planetary gear mechanism, the first and second planetary gears, the first to fourth clutches, and the first and second brakes. Such a multi-speed transmission attains first to tenth forward speeds and a reverse speed by selectively engaging three of the first to fourth clutches and the first and second brakes. As a result, the spread (the gear ratio range=the gear ratio at the lowest shift speed/the gear ratio at the highest shift speed) can be increased, and power transmission efficiency, namely fuel economy and acceleration performance of the vehicle, can be improved. Moreover, proper step ratios (the gear ratio at a certain shift speed/the gear ratio at a shift speed that is one shift speed higher than the certain shift speed) can be achieved (an increase in step ratio can be restrained), and shift feeling can be improved. This automatic transmission can therefore satisfactorily improve both power transmission efficiency and drivability.

In this automatic transmission, like the input element of the Ravigneaux type planetary gear mechanism, the second rotary element of the first planetary gear is constantly coupled to the input member, and the third rotary element of the first planetary gear is selectively connected to the output member (and the fifth rotary element of the second planetary gear) by the fourth clutch. This can reduce torque allocated to the fourth clutch as compared to, e.g., the clutch that selectively connects the second rotary element of the first planetary gear to the input member in the transmission in which the third rotary element of the first planetary gear together with the fifth rotary element of the second planetary gear is constantly coupled to the output member, and the second rotary element of the first planetary gear is selectively connected to the input member. As a result, the fourth clutch can be made compact in at least one of the axial and radial directions. Accordingly, both power transmission efficiency and drivability can be improved and an increase in overall size of the power transmission device can be restrained.

The above multi-speed transmission can attain first to tenth forward speeds and a reverse speed by engaging the first to fourth clutches and the first and second brakes as follows. The first forward speed is attained by engaging the first clutch, the second clutch, and the second brake. The second forward speed is attained by engaging the first clutch, the first brake, and the second brake. The third forward speed is attained by engaging the second clutch, the first brake, and the second brake. The fourth forward speed is attained by engaging the fourth clutch, the first brake, and the second brake. The fifth forward speed is attained by engaging the second clutch, the fourth clutch, and the first brake. The sixth forward speed is attained by engaging the first clutch, the fourth clutch, and the first brake. The seventh forward speed is attained by engaging the first clutch, the third clutch, and the fourth clutch. The eighth forward speed is attained by engaging the third clutch, the fourth clutch, and the first brake. The ninth forward speed is attained by engaging the first clutch, the third clutch, and the first brake. The tenth forward speed is attained by engaging the second clutch, the third clutch, and the first brake. The reverse speed is attained by engaging the second clutch, the third clutch, and the second brake.

As described above, the multi-speed transmission of the above aspect attains the first to tenth forward speeds and the reverse speed by engaging three of the six engagement elements, i.e., the first to fourth clutches and the first and second brakes, and disengaging the remaining three engagement elements. The number of engagement elements to be disengaged to attain a shift speed can thus be reduced as compared to, e.g., transmissions that attain a plurality of shift speeds by engaging two of the six engagement elements and disengaging the remaining four engagement elements. This can reduce drag loss in the engagement elements disengaged to attain a shift speed and can further improve power transmission efficiency of the multi-speed transmission.

The output member may be an output shaft that is coupled to a rear wheel of the vehicle via a differential gear. That is, the power transmission device according to the present disclosure may be a power transmission device that is mounted on a rear wheel drive vehicle. It should be understood that the power transmission device of the present disclosure may be mounted on a front wheel drive, as described above.

The present disclosure is not limited in any way to the above embodiments, and various modifications can be made as will be apparent to those skilled in the art. The above descriptions are merely shown as specific exemplary embodiments and are not intended to limit the elements described therein.

INDUSTRIAL APPLICABILITY

The present disclosure is applicable, for example, to manufacturing industries of power transmission device, etc.

The invention claimed is:

1. A power transmission device including a multi-speed transmission that has a planetary gear and that shifts power transmitted from a driving source of a vehicle to an input member to transmit the shifted power to an output member, a parking lock device having a parking gear and a parking pawl that can be engaged with the parking gear, and a case that accommodates the multi-speed transmission and the parking lock device, wherein the planetary gear has a carrier that is rotatably supported by a central shaft rotatably supported by the case and that is coupled to the output member such that the carrier rotates together with the output member, at least one of another planetary gear different from the planetary gear included in the multi-speed transmission and a clutch is placed between the carrier and the output member in an axial direction, the case has a small diameter tubular portion rotatably supporting the output member, an annular wall portion extended radially outward from the small diameter tubular portion, and a large diameter tubular portion extended in the axial direction from an outer periphery of the annular wall portion such that at least one of at least a part of the other planetary gear and at least a part of the clutch is surrounded, a vehicle body-side constituent member is fixed to a vehicle body of the vehicle so as to at least partially overlap the small diameter tubular portion, the annular wall portion, and the large diameter tubular portion of the case as viewed in a radial direction of the power transmission device, and the parking gear is coupled to an outer periphery of the carrier so as to rotate together with the carrier.

2. The power transmission device according to claim 1, wherein the carrier includes a first shaft support portion that supports one end of a pinion shaft inserted through a pinion gear of the planetary gear, and a second shaft support portion that is located on the output member side of the first shaft support portion and supports the other end of the pinion shaft, and the parking gear is coupled to an outer periphery of the second shaft support portion and is coupled to the output member so as to rotate together with the output member.

3. The power transmission device according to claim 2, wherein the first shaft support portion is rotatably supported by the central shaft, and the central shaft is supported by the case via the output member.

4. The power transmission device according to claim 2, wherein both the other planetary gear and the clutch are placed between the carrier and the output member in the axial direction, and the clutch connects and disconnects the carrier to and from any of rotary elements of the other planetary gear.

5. The power transmission device according to claim 2, wherein the case has an end wall portion, which is extended downward in the power transmission device from a lower part of the large diameter tubular portion and to which an oil pan that stores hydraulic oil is fixed, the parking lock device includes a parking rod that can advance and withdraw with respect to the parking pawl, and a tubular cam member that causes the parking pawl to mesh with the parking gear according to the advancing and withdrawing movement of the parking rod, the parking pawl, the parking rod, and the cam member are placed below the parking gear in the power transmission device so as to overlap the end wall portion as viewed in the axial direction of the power transmission device, and the vehicle body-side constituent member is placed so as to face the parking pawl, the parking rod, and the cam member in the axial direction with the end wall portion interposed therebetween.

6. The power transmission device according to claim 2, wherein the vehicle body-side constituent member is a mount that is interposed between the case of the multi-speed transmission and the vehicle body to absorb vibration.

7. The power transmission device according to claim 3, wherein both the other planetary gear and the clutch are placed between the carrier and the output member in the axial direction, and the clutch connects and disconnects the carrier to and from any of rotary elements of the other planetary gear.

8. The power transmission device according to claim 3, wherein the case has an end wall portion, which is extended downward in the power transmission device from a lower part of the large diameter tubular portion and to which an oil pan that stores hydraulic oil is fixed, the parking lock device includes a parking rod that can advance and withdraw with respect to the parking pawl, and a tubular cam member that causes the parking pawl to mesh with the parking gear according to the advancing and withdrawing movement of the parking rod, the parking pawl, the parking rod, and the cam member are placed below the parking gear in the power transmission device so as to overlap the end wall portion as viewed in the axial direction of the power transmission device, and the vehicle body-side constituent member is placed so as to face the parking pawl, the parking rod, and the cam member in the axial direction with the end wall portion interposed therebetween.

9. The power transmission device according to claim 7, wherein the clutch includes a clutch drum and a friction engagement plate having an outer periphery fitted in a tubular portion of the clutch drum, and can couple one rotary element of the planetary gear to one rotary element of the other planetary gear, the clutch drum has an annular portion that is coupled to the output member such that the annular portion rotates together with the output member, and the tubular portion that is extended in the axial direction from an outer periphery of the annular portion and that is coupled to the parking gear such that the tubular portion rotates together with the parking gear, the other planetary gear is placed between the planetary gear and the clutch in the axial direction and is surrounded by the tubular portion of the clutch drum, and the large diameter tubular portion of the case surrounds the clutch.

10. The power transmission device according to claim 7, wherein the case has an end wall portion, which is extended downward in the power transmission device from a lower part of the large diameter tubular portion and to which an oil pan that stores hydraulic oil is fixed, the parking lock device includes a parking rod that can advance and withdraw with respect to the parking pawl, and a tubular cam member that causes the parking pawl to mesh with the parking gear according to the advancing and withdrawing movement of the parking rod, the parking pawl, the parking rod, and the cam member are placed below the parking gear in the power transmission device so as to overlap the end wall portion as viewed in the axial direction of the power transmission device, and the vehicle body-side constituent member is placed so as to face the parking pawl, the parking rod, and the cam member in the axial direction with the end wall portion interposed therebetween.

11. The power transmission device according to claim 9, wherein the case has an end wall portion, which is extended downward in the power transmission device from a lower part of the large diameter tubular portion and to which an oil pan that stores hydraulic oil is fixed, the parking lock device includes a parking rod that can advance and withdraw with respect to the parking pawl, and a tubular cam member that causes the parking pawl to mesh with the parking gear according to the advancing and withdrawing movement of the parking rod, the parking pawl, the parking rod, and the cam member are placed below the parking gear in the power transmission device so as to overlap the end wall portion as viewed in the axial direction of the power transmission device, and the vehicle body-side constituent member is placed so as to face the parking pawl, the parking rod, and the cam member in the axial direction with the end wall portion interposed therebetween.

12. The power transmission device according to any one of claim 9, wherein the vehicle body-side constituent member is a mount that is interposed between the case of the multi-speed transmission and the vehicle body to absorb vibration.

13. The power transmission device according to claim 11, wherein the vehicle body-side constituent member is a mount that is interposed between the case of the multi-speed transmission and the vehicle body to absorb vibration.

14. The power transmission device according to claim 13, wherein the multi-speed transmission includes a Ravigneaux type planetary gear mechanism having an input element, a fixable element, a first output element, and a second output element, a first planetary gear as the other planetary gear having a first rotary element, a second rotary element, and a third rotary element which are sequentially arranged at intervals corresponding to a gear ratio on a speed diagram, a second planetary gear as the planetary gear having a fourth rotary element, a fifth rotary element as the carrier, and a sixth rotary element which are sequentially arranged at intervals corresponding to a gear ratio on a speed diagram, first, second, and third clutches and a fourth clutch as the clutch, and first and second brakes, the input element of the Ravigneaux type planetary gear mechanism and the second rotary element of the first planetary gear are constantly coupled to the input member, the first rotary element of the first planetary gear is constantly coupled to the fourth rotary element of the second planetary gear, the fifth rotary element of the second planetary gear is constantly coupled to the output member, the first clutch connects and disconnects the first rotary element of the first planetary gear and the fourth rotary element of the second planetary gear, which are constantly coupled together, to and from the first output element of the Ravigneaux type planetary gear mechanism, the second clutch connects and disconnects the first rotary element of the first planetary gear and the fourth rotary element of the second planetary gear, which are constantly coupled together, to and from the second output element of the Ravigneaux type planetary gear mechanism, the third clutch connects and disconnects the sixth rotary element of the second planetary gear to and from the first output element of the Ravigneaux type planetary gear mechanism, the fourth clutch connects and disconnects the fifth rotary element of the second planetary gear and the output member, which are constantly coupled together, to and from the third rotary element of the first planetary gear, the first brake connects the fixable element of the Ravigneaux type planetary gear mechanism to a stationary member to hold the fixable element of the Ravigneaux type planetary gear mechanism stationary, and disconnects the fixable element of the Ravigneaux type planetary gear mechanism from the stationary member, and the second brake connects the sixth rotary element of the second planetary gear to the stationary member to hold the sixth rotary element of the second planetary gear stationary, and disconnects the sixth rotary element of the second planetary gear from the stationary member.

15. The power transmission device according to claim 14, wherein a first forward speed is attained by engaging the first clutch, the second clutch, and the second brake, a second forward speed is attained by engaging the first clutch, the first brake, and the second brake, a third forward speed is attained by engaging the second clutch, the first brake, and the second brake, a fourth forward speed is attained by engaging the fourth clutch, the first brake, and the second brake, a fifth forward speed is attained by engaging the second clutch, the fourth clutch, and the first brake, a sixth forward speed is attained by engaging the first clutch, the fourth clutch, and the first brake, a seventh forward speed is attained by engaging the first clutch, the third clutch, and the fourth clutch, an eighth forward speed is attained by engaging the third clutch, the fourth clutch, and the first brake, a ninth forward speed is attained by engaging the first clutch, the third clutch, and the first brake, a tenth forward speed is attained by engaging the second clutch, the third clutch, and the first brake, and a reverse speed is attained by engaging the second clutch, the third clutch, and the second brake.

16. The power transmission device according to claim 15, wherein the output member is an output shaft that is coupled to a rear wheel of the vehicle via a differential gear.

17. The power transmission device according to claim 1, wherein
both the other planetary gear and the clutch are placed between the carrier and the output member in the axial direction, and
the clutch connects and disconnects the carrier to and from any of rotary elements of the other planetary gear.

18. The power transmission device according to claim 1, wherein
the case has an end wall portion, which is extended downward in the power transmission device from a lower part of the large diameter tubular portion and to which an oil pan that stores hydraulic oil is fixed,
the parking lock device includes a parking rod that can advance and withdraw with respect to the parking pawl, and a tubular cam member that causes the parking pawl to mesh with the parking gear according to the advancing and withdrawing movement of the parking rod,
the parking pawl, the parking rod, and the cam member are placed below the parking gear in the power transmission device so as to overlap the end wall portion as viewed in the axial direction of the power transmission device, and
the vehicle body-side constituent member is placed so as to face the parking pawl, the parking rod, and the cam member in the axial direction with the end wall portion interposed therebetween.

19. The power transmission device according to claim 1, wherein
the vehicle body-side constituent member is a mount that is interposed between the case of the multi-speed transmission and the vehicle body to absorb vibration.

20. The power transmission device according to claim 1, wherein
the multi-speed transmission includes
a Ravigneaux type planetary gear mechanism having an input element, a fixable element, a first output element, and a second output element,
a first planetary gear as the other planetary gear having a first rotary element, a second rotary element, and a third rotary element which are sequentially arranged at intervals corresponding to a gear ratio on a speed diagram,
a second planetary gear as the planetary gear having a fourth rotary element, a fifth rotary element as the carrier, and a sixth rotary element which are sequentially arranged at intervals corresponding to a gear ratio on a speed diagram,
first, second, and third clutches and a fourth clutch as the clutch, and
first and second brakes,
the input element of the Ravigneaux type planetary gear mechanism and the second rotary element of the first planetary gear are constantly coupled to the input member,
the first rotary element of the first planetary gear is constantly coupled to the fourth rotary element of the second planetary gear,
the fifth rotary element of the second planetary gear is constantly coupled to the output member,
the first clutch connects and disconnects the first rotary element of the first planetary gear and the fourth rotary element of the second planetary gear, which are constantly coupled together, to and from the first output element of the Ravigneaux type planetary gear mechanism,
the second clutch connects and disconnects the first rotary element of the first planetary gear and the fourth rotary element of the second planetary gear, which are constantly coupled together, to and from the second output element of the Ravigneaux type planetary gear mechanism,
the third clutch connects and disconnects the sixth rotary element of the second planetary gear to and from the first output element of the Ravigneaux type planetary gear mechanism,
the fourth clutch connects and disconnects the fifth rotary element of the second planetary gear and the output member, which are constantly coupled together, to and from the third rotary element of the first planetary gear,
the first brake connects the fixable element of the Ravigneaux type planetary gear mechanism to a stationary member to hold the fixable element of the Ravigneaux type planetary gear mechanism stationary, and disconnects the fixable element of the Ravigneaux type planetary gear mechanism from the stationary member, and
the second brake connects the sixth rotary element of the second planetary gear to the stationary member to hold the sixth rotary element of the second planetary gear stationary, and disconnects the sixth rotary element of the second planetary gear from the stationary member.

* * * * *